US008480771B2

(12) United States Patent
Gaur et al.

(10) Patent No.: US 8,480,771 B2
(45) Date of Patent: Jul. 9, 2013

(54) GASIFICATION PROCESS AND PRODUCER GAS

(76) Inventors: Siddhartha Gaur, Plano, TX (US); Vibha Bansal, Plano, TX (US)

( * ) Notice: Subject to any disclaimer, the term of this patent is extended or adjusted under 35 U.S.C. 154(b) by 1396 days.

(21) Appl. No.: 12/100,956

(22) Filed: Apr. 10, 2008

(65) Prior Publication Data
US 2009/0255182 A1  Oct. 15, 2009

(51) Int. Cl.
*C10J 3/16* (2006.01)

(52) U.S. Cl.
USPC .......................................................... 48/203

(58) Field of Classification Search
USPC ... 700/271, 266, 268; 422/55, 626; 48/197 R, 48/203
See application file for complete search history.

(56) References Cited

U.S. PATENT DOCUMENTS

| 3,971,639 | A | 7/1976 | Matthews |
| 3,985,519 | A | 10/1976 | Kalina et al. |
| 4,017,272 | A | 4/1977 | Anwer et al. |
| 4,137,298 | A | 1/1979 | Zielke et al. |
| 4,200,439 | A | 4/1980 | Lang |
| 4,204,843 | A | 5/1980 | Neavel |
| 4,415,431 | A | 11/1983 | Matyas et al. |
| 4,490,156 | A | 12/1984 | Marion et al. |
| 4,491,456 | A | 1/1985 | Schlinger |
| 4,617,027 | A | 10/1986 | Lang |
| 4,710,483 | A | 12/1987 | Burk et al. |
| 4,832,831 | A | 5/1989 | Meyer et al. |
| 4,842,615 | A | 6/1989 | Meyer et al. |
| 5,063,732 | A | 11/1991 | Calderon |
| 5,132,007 | A | 7/1992 | Meyer et al. |
| 5,276,237 | A | 1/1994 | Mieville |
| 6,648,931 | B1 | 11/2003 | Rao |
| 6,911,058 | B2 | 6/2005 | Calderon et al. |
| 7,879,119 | B2 * | 2/2011 | Abughazaleh et al. ..... 48/197 R |
| 2004/0261670 | A1 | 12/2004 | Dueck et al. |
| 2006/0228294 | A1 * | 10/2006 | Davis et al. .................. 423/659 |
| 2008/0078122 | A1 * | 4/2008 | Clark ................................ 48/61 |

OTHER PUBLICATIONS

Gasification, Wikipedia, Dec. 2008, 4 pages.
Coal Conversion Facts, World Coal Institute, Dec. 2005, 4 pages.
Gas separation, Wikipedia, Feb. 2007, 1 page.
Syngas, Wikipedia, Dec. 2006, 2 pages.
Wood gas, Wikipedia, Dec. 2006, 4 pages.
Town gas, Wikipedia, Dec. 2006, 12 pages.
Molecular sieve, Wikipedia, Feb. 2007, 1 page.
Stewart J. Clayton et al.; U.S. DOE's Perspective on Long-Term Market Trends and R&D Needs in Gasification; Gasification Technologies Program, 5th European Gasification Conference; Apr. 8-10, 2002; 20 pages.

* cited by examiner

*Primary Examiner* — Wayne Langel
*Assistant Examiner* — Syed Iqbal
(74) *Attorney, Agent, or Firm* — Osha • Liang LLP; John W. Montgomery

(57) ABSTRACT

A gasification process for making producer gas is disclosed. A consistent quality of raw carbon source material is supplied for gasification. The impurity content of the raw carbon source material is adjusted to within an acceptable consistent range of impurity content. The raw carbon source material is heated in a non-oxidizing environment to adjust the tar content and to remove volatile hydrocarbon constituents and to produce a devolatilized carbon source material. The devolatilized carbon source material is gasified by heating the carbon source material to a gasification temperature in a gasification generator, supplying steam, and supplying enhanced oxygen content air to react with the devolatilized carbon source material and to thereby form consistent, high energy value, low impurity producer gas.

5 Claims, 6 Drawing Sheets

GASIFICATION PROCESS AND PRODUCER GAS

BACKGROUND OF INVENTION

1. Field of the Invention

The invention relates generally to a gasification process for the production of producer gas and to a production device, system, and method for implementing the process and for the production of producer gas.

2. Background Art

A gasification process is generally a process by which solid or liquid material is converted into a gaseous form, a gaseous chemical composition formed of several other ingredients, or a gaseous mixture of several substances. The terms gasification and gasifier are often used to refer to a process and a device, respectively, for making producer gas from solid coal, coke, or other carbon source materials. Prior to gasification, source materials are often subjected to volatilization or heating to drive off volatiles such as methane ($CH_4$). Sometimes the preheating is in the form of pyrolysis where biomass or coal turns into char releasing polycyclic aromatic hydrocarbons, tar and methane. A gasifier may be fed with the pyrolysed char. Producer gas is generally considered to be the gas produced by gasification of the carbon source after the volatiles such as methane and other aromatic hydrocarbons have been largely driven off by a heating or consumed by oxidation for producing heat for gasification of the carbon fuel source material.

Producer gas is generally a low grade fuel gas consisting chiefly of a combustible mixture of carbon monoxide, nitrogen and hydrogen. Producer gas may be generated by passing air together with steam over a carbon source such as coke or coal that is burning in a furnace or a generator. The producer gas is the product of thermal gasification of the carbon containing materials, in a gasifier or in a producer gas generator. Producer gas results from a high temperature reaction (>700° C.), where carbon reacts with steam ($H_2O$) or a limited amount of air or oxygen producing carbon monoxide (CO), molecular hydrogen ($H_2$), and carbon dioxide ($CO_2$). Typically the fuel is introduced through the top of the generator and air is forced upward through the burning carbon fuel such as coke or coal. The carbon of the fuel is oxidized by the portion of the oxygen of the air introduce from below to form the carbon monoxide. The nitrogen portion of the air, being inert, passes through the burning carbon fuel or fire generally without change. Steam is also introduced with the air so that hydrogen is also produced and the final gaseous product contains carbon monoxide, nitrogen and hydrogen.

SUMMARY OF INVENTION

In one or more embodiments of the invention a gasification process for making producer gas is disclosed that includes supplying a consistent quality raw carbon source material for gasification. The raw carbon source material may be in primarily solid, fluid, or liquid form prior to gasification and in some cases there may be a small amount of gaseous form depending upon the primary phase and temperature of the raw source material. There is an adjusting of impurity content of the raw carbon source material to within an acceptable consistent range of impurity content. There is heating of the raw carbon source material in a non-oxidizing environment to remove volatile hydrocarbon constituents (such as methane) and to produce a devolatilized carbon source. Gasification of the devolatilized carbon source material is completed by heating the carbon source material to a gasification temperature in a gasification generator, supplying steam, and supplying air to react and form producer gas.

Other aspects and advantages of the invention will be apparent from the following description and the appended claims.

DETAILED DESCRIPTION

Figure 1:
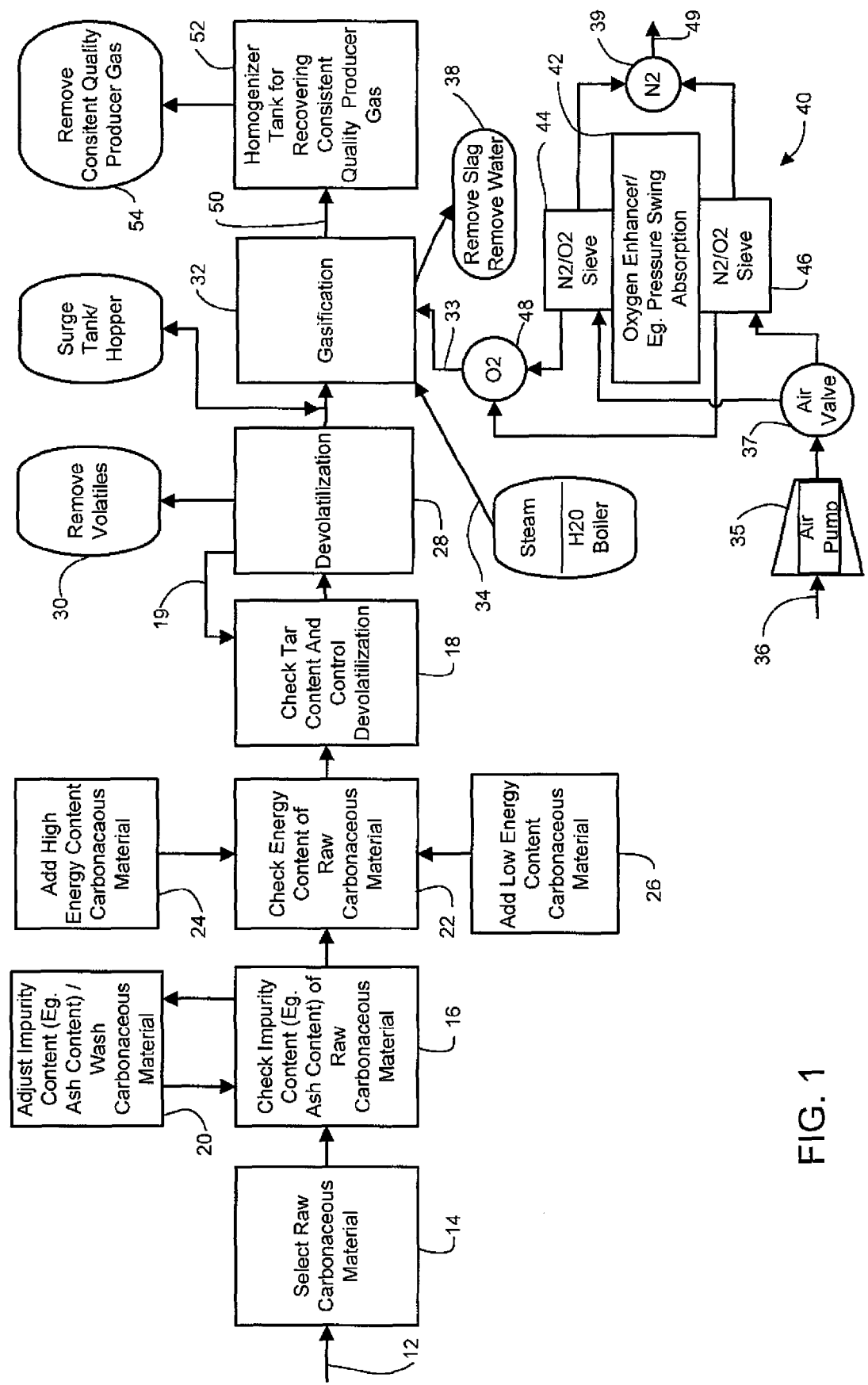
FIG. 1 is a schematic diagram of a gasifier system according to one or more embodiments of the invention.

Applicants have considered a need for a high quality producer gas and a gasification process and method for obtaining such high quality producer gas. It has been considered that producer gas generally has a low and unpredictable heating value. The heat of combustion of producer gas is rather low compared to other fuels. It has been used in some industries because it can be made with cheap fuel; however, the production is often inconsistent and contaminated with particulate materials, soot, ash, and tar or other residual substances, solids and liquids. This can require additional processing that further reduces the efficiency and value of using producer gas. A typical mixture or composition for producer gas may be in ranges as indicated below:

Nitrogen $N_2$ 55% to 60%,
Carbon monoxide CO 23% to 27%,
Hydrogen $H_2$ 10% to 15%,
Carbon dioxide $CO_2$ 3% to 5%,
Oxygen $O_2$ 1% to 2%.

Such a composition may have a low heating value 90-120 BTU/cubic foot that is in contrast to 1000 BTU/cubic foot for natural gas. As a point of reference on the basis of energy per unit of mass, it has been indicated that the heat of combustion of producer gas is rather low compared to other fuels. For example, it has been reported that producer gas has a heating value of about 5.7 MJ/kg versus 55.9 MJ/kg for natural gas and 44.1 MJ/kg for gasoline, *Internal-Combustion Engine in Theory and Practice*, Taylor, p. 46 (2nd Ed, 1985). Presumably, these values can vary somewhat from sample to sample and the chemical composition by volume is also variable such that a direct comparison of different types of fuels in gaseous phase and liquid phase is not always proportional. Nevertheless, it is understood that variable energy content in a continuously flowing fuel into an engine would mean that a stoichiometric burning mixture in an engine or turbine would not be consistent and would not be easily controlled.

A process of biomass gasification is a century old technology where wood, charcoal and other biomass is treated in presence of some air or oxygen, insufficient to combust it, and the gas formation is maximized. The temperature within the reactor rises on account of oxygen consuming reactions. The resulting gas tends to be higher in $CO_2$ content than in case of pyrolysis. In many cases using an oxidative process with air or oxygen either avoids the production of char or removes and consumes much char by the oxidation process. The final output of the gas in the process can be increased. A crucial parameter in determining product composition and operating temperature in air or oxygen gasification is the equivalence ratio, i.e. the ratio between the amount of air or oxygen admitted to the reaction chamber and the amount that would be required to completely oxidize the feedstock.

A type of "producer gas" known as wood gas may be produced from wood chips, sawdust, charcoal, coal, rubber or similar materials as fuel supplied to a wood gasifier that burns the fuel components incompletely in a fire box, producing solid ashes and soot and wood gas. The soot and ash have to be removed periodically from the gasifier and constantly from the gas. The wood gas can then be filtered for tars and soot/ash particles, cooled and directed to a gas turbine, an internal combustion engine or another type of energy converting device. Most of the devices that convert gaseous fuel energy into power or work have severe requirements to the purity of the wood gas, so the gas often has to pass through extensive gas cleaning in order to remove or convert (i.e. to "crack") tars and particles. It is well known that attempting to run wood gas in an internal combustion engine is problematic for maintaining proper combustion mixture ratios due to inconsistent energy quality of the wood gas and also due to the impurities that interfere with the mechanical operation of the engine. Wood gas has been used, for example during World War II, to power cars with internal combustion engines with a wood gasifier attached. This was prompted primarily by the lack of oil or other acceptable fuels. In more recent times, wood gas has been suggested for use to heat and cook in developing countries, or even to produce electricity when combined with a gas turbine or internal combustion engine. Compared to the WWII technology, gasifiers have become less dependent on constant attention due to the use of sophisticated electronic control systems, but it remains difficult to get usefully clean gas from them.

A process that combines the methane production from initial pyrolysis stages together with the producer gas from a subsequent gasification process is sometimes referred to as syngas. It generally has higher energy content than producer gas due to the additional methane ($CH_4$) content. The production of syngas from biomass is considered potentially useful for the production of methanol and hydrogen, each of which may have a future as fuels for transportation. The heat of combustion of producer gas is rather low compared to other fuels. For example, consider a syngas having a composition as indicated below:

Nitrogen $N_2$ 50.9%,
Carbon monoxide CO 27.0%,
Hydrogen $H_2$ 14.0%,
Carbon dioxide $CO_2$ 4.5%,
Methane $CH_4$ 3.0%,
Oxygen $O_2$ 0.6%.

Such a composition, if precisely maintained, may have a consistently low heating value of 110 BTU/cubic foot that might be in contrast to about 1000 BTU/cubic foot for natural gas. Unfortunately, the value reported both for the chemical composition percentages and the energy value in most cases is an average or approximate value and in reality these values also vary significantly from batch to batch. Variable energy content of a fuel source for an internal combustion engine or for a turbine means that the stoichiometric burning mixture in the engine or turbine will not be consistent and will not be easily controlled. Variable energy content is particularly problematic in a continuous process where the producer gas is to be used in an energy conversion process, a steam turbine or an internal combustion engine while the fuel gas is being produced at the same time.

The quality of the gas from different types of gasifiers varies widely. Staged gasifiers, where pyrolysis and gasification occur separately (instead of in the same reaction zone as was the case in early WWII gasifiers) can be engineered to produce nearly tar-free gas (<1 mg/m³), while single reactor fluid-bed gasifiers may exceed 50,000 mg/m³ tar. The fluid bed reactors might be considered as being much more compact (more capacity per volume and price). Depending on the intended use of the gas, tar could possibly be beneficial as well; increasing the higher heating value of the gas. Tar is not normally beneficial for purposes of internal combustion engines and turbines. Other impurities, such as ash or other inert particulate matter, is also problematic for internal combustion engines both in terms of controlling the burning processes and also in terms of wear and deterioration of the moving engine or turbine components. In the case of coal or other low tar carbon sources used to make producer gas, there is a particular problem with ash content from the coal remaining in the resultant producer gas. Removing tar and/or ash with filtration and settling tanks requires added investment cost, space, and ongoing service, maintenance, replacement, and repair.

The inventors have investigated the use of producer gas for purposes of running engines to generate electricity on a small scale in a range of one megawatt per hour to tens of mega watts per hour. Most utility company generators are based upon steam turbines with much larger generation capacity that is not efficiently scalable to the smaller range that has been found to be useful for a single factory or industrial plant to generate its own electrical energy. Internal combustion engines or direct fuel burning turbines have been found to be better suited for the smaller range of electrical energy production. However, the fuel cost for such engines or turbines can be significant where refinery fuels such as gasoline or natural gas might be appropriate for running the engines. Based upon the considerations above with respect to producer gas as a fuel for internal combustion engines or turbines, as well as other considerations, the inventors have determined that producer gas that is useful for efficient electrical energy generation on a factory or plant scale of about one to ten mega watts per hour and particularly producer gas for use in internal combustion engines that may be used for generating this relatively low range of electrical generation output, will require overcoming several obstacles. Initially, internal combustion engines require consistent and clean fuel. Also it will be useful to have fuel that is inexpensive to make yet has high energy content or a high energy value.

FIG. 1 shows a schematic diagram of a gasifier system 10 according to one or more embodiments of the invention and the system 10 may be used to implement one or more inventive gasification processes for making producer gas according to aspects of the invention. In one or more embodiments, a gasification process may include some or all of the several system components and some or all of several process steps. It has been determined by the inventors that one of the factors contributing to inconsistent quality and contamination of producer gas is the variations of the content of the fuel sources used. Whether it is biomass, wood chips, coal, coke, carbon soot or other carbon containing material that is to be gasified; the impurity content and the energy content is not consistent from one such material to another and also varies widely from one batch of a similar material to another batch.

For example, the impurities content, such as the ash content or the tar content, can vary widely and can be further impacted by even the method of mining. For example, blasting, digging, and shoveling and transport techniques may include more or less of the surrounding earth material. It may be noted that even a small amount of ash or tar may foul a standard internal combustion engine. Thus, fluctuations in the purity of ordinary producer gas make it an undesirable or even an unacceptable choice. Also, it has been found by the inventors that the energy content of coal can vary significantly depending upon the mine from which it was obtained or depending upon the location within the formation in the same mine. As a result, it has been found that the content of the resulting producer gas will likewise be inconsistent.

According to one aspect of an embodiment of the invention shown in FIG. 1, a consistent quality raw carbon source material is supplied at 12 or alternatively selected to be supplied at 14. For example, the producer gas to be made for a particular purpose of running in an internal combustion engine or a particular boiler for steam generation and/or the energy content of a feed source that is required to obtain a desired energy value producer gas might be know from industrial data or from experimentation or other empirically determined information. The energy content of samples of a batch or raw carbon source material may be measured and selected or adjusted so that an appropriate energy value carbon feed source material may be supplied.

It will be understood that the raw carbon source material may be solid or liquid. In the event of a solid material such as coal, coke, or carbon soot, the carbon material will be chopped, pulverized or otherwise broken into generally "flowable", small chunks, granules, or dust. The impurity content of the raw carbon source material may be adjusted to within an acceptable consistent range of impurity content. For example, the adjusting of impurity content of the raw carbon source material in one or more embodiments of the gasification process may include selecting a raw carbon source material having acceptably low tar content and/or an acceptably low ash content. Acceptable ranges of tar may be determined for the intended use of the producer gas to be produced. Solid carbon source materials such as coal, coke or carbon soot may be selected based upon determination of their tar content and then by combining a mixture of different combinations of various raw sources of carbon in appropriate proportions to obtain the total tar content desired.

In one embodiment, the purity or the quantities of one or more impurities of the raw carbonaceous source material may be checked at 16. If it is not within a range of desired or required purity, the purity may be adjusted. For example, the purity of the batch may be adjusted by adding material having known ash content or known tar content at 18 to the mixture of raw carbon source material to adjust the ash content or the tar content. Additionally, or alternatively, the ash content may be adjusted at 20 by washing to adjust the ash content by removing a sufficient quantity to obtain a desired lower ash content. Such washing may, for example, include physically washing, chemically washing, or both. It has been found by the inventors that low tar content raw carbon source material often has other impurities such as ash. Thus, adjustments by adding known low tar content material may increase the ash content and the material may require washing treatment to reduce the ash content of the carbonaceous materials. In one or more embodiments, the impurities such as ash may be measured at 16 and adjusted by washing the raw source material at 20, for example, by physically or chemically washing the raw carbon source materials and returning them to the process stream.

The adjusting of impurity content of the raw carbon source material in one or more embodiments of the gasification process may include measuring a measured ash content of one batch of raw carbon source material, comparing the measured ash content to a predetermined acceptable range of ash content values for an intended use of the producer gas to be formed, and if the measured ash content is within the acceptable range accepting the batch for supply to the gasification generator, and if the ash content is outside of the range then adjusting the ash content to within the acceptable range.

The adjusting of the measured ash content to within the acceptable range if the ash content is measured outside the higher end of the acceptable range, in one or more embodiments of the gasification process, may include washing the raw carbon source material to remove a sufficient amount of ash to adjust the measured ash content to within the acceptable range.

The supplying a consistent quality raw carbon source material in one or more embodiments of the gasification process may include subjecting one batch of raw carbon material to a consistency process including determining at 22 an average measured energy value of a batch carbon feed. If the energy value is not within a desired or required range the energy value might be adjusted. For example, the adjusting of the energy value may include adding a quantity of known energy content or energy quality feed material at 24 or 26, wherein the know energy quality and quantity added may be calculated together with measured energy content or measure energy quality value of carbon feed are calculated to adjust the total energy quality of the batch of raw carbon feed. The calculation and/or measurement can be repeated if necessary to obtain a consistent energy value for the carbon feed source to within a predetermined consistent range of average energy values for an intended use of the producer gas to be formed. This process might be carried out substantially continuously or it might be carried out one batch after another and supplying the one batch of consistent energy quality while a next batch of raw material is subjected to the consistency process. In the embodiment shown in FIG. 1, too low of energy content can be adjusted up by adding high energy content carbonaceous materials at 24 and if a particular batch is measured at 22 to be too high of energy content it may be lowered by adding lower content energy carbonaceous materials at 26. Although it is considered by some that a higher energy value might be wanted, the inventors have discovered that a lower yet consistently maintainable energy value is also useful so that the engines or heat generating devices in which the producer gas will be used can be properly adjusted to operate continuously and reliably based upon the expectation of such a consistent low energy value.

In one or more embodiments of the invention the tar content can be checked and a process of devolatilization 28 can be controlled at 18 to efficiently remove with the volatiles only the amount of tar necessary so that an acceptable tar content is obtained. It has been found that, although a producer gas that is free of tar is desirable, it is not necessary to expend an inordinate amount of time and energy to remove all of the tar from the source carbon material. Particularly useful is a process for the controlling of the amount of tar content in the carbon source material so that the process of gasification at 32 will effectively convert substantially all of the tar into beneficial or non-harmful constituents of the producer gas. Consider, for example, the theoretical selection of a thermal coal as a raw material source of carbon. A typical source of thermal coal may have about 40% volatile matter (for example, tar having a chemical composition represented by the formula $C_5H_8$), about 50% Fixed Carbon (C), and about 10% Ash content ($SiO_2$). In the gasification process, the oxygen needed for a stoichiometric combustion would be given by the chemical process equation as follows:

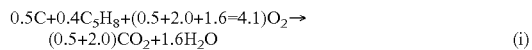

$$0.5C+0.4C_5H_8+(0.5+2.0+1.6=4.1)O_2 \rightarrow (0.5+2.0)CO_2+1.6H_2O \quad (i)$$

It might be expected that only about 40% of the oxygen will actually be available for combustion, so that an amount of tar will remain as follows:

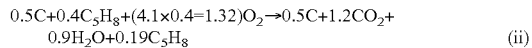

$$0.5C+0.4C_5H_8+(4.1 \times 0.4=1.32)O_2 \rightarrow 0.5C+1.2CO_2+0.9H_2O+0.19C_5H_8 \quad (ii)$$

Thus, there will be a significant quantity of tar. For example, 0.19 moles of tar per 2.6 moles of other constituents in the resulting producer gas (about 7% tar).

In a case where the coal is known to have, or is otherwise found to have, as by measuring the tar content at 18 in FIG. 1, a larger than desired amount of tar, a portion of the tar may be removed by volatilization at 28. For example, the adjusted content may be found to comprise about 15% Volatile matter, 72% Fixed Carbon, and 13% Ash so that the oxygen needed for a stoichiometric combustion would be given by the chemical process equation as follows:

$$0.72C+0.15C_5H_8+(0.72+0.75+0.3=1.77)O_2 \rightarrow (0.72+0.75)CO_2+0.6H_2O \quad (iii)$$

If only about 40% of the oxygen will actually be available for combustion, an amount of tar will remain as follows:

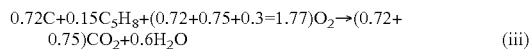

$$0.76C+0.15C_5H_8+0.708O_2 \rightarrow 0.72C+0.506CO_2+0.4H_2O+0.049C_5H_8 \quad (iv)$$

Thus, the amount of tar might be considered relatively small after the partial adjustment to remove a portion of the tar at the volatiles removal process, for example, 0.049 moles of tar per 1.6 moles of other constituents in the resulting producer gas (about 3% tar).

In a case where the coal source is known to have, or is otherwise found to have, as by measuring the tar content in FIG. 1, more tar than is desired, a greater portion of the tar may be removed by volatilization at 28. For example, the devolatilized carbon source that might be re-circulated at 19 into the checking and control stage 18 and it might be found that the reduced amount of tar is not sufficiently reduced so that further adjustment will be beneficial. For example, the adjusted content may be found to comprise about 10% Volatile matter, 76% Fixed Carbon, and 14% Ash, so that the oxygen needed for a stoichiometric combustion would be given by the chemical process equation as follows:

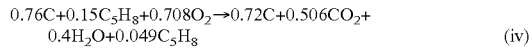

$$0.76C+0.1C_5H_8+(0.76+0.5+0.2=1.46)O_2 \rightarrow (0.76+0.5)CO_2+0.4H_2O \quad (v)$$

If only about 40% of the oxygen will actually be available for combustion, an amount of tar will remain after gasification as follows:

$$0.76C+0.1C_5H_8+0.58O_2 \rightarrow 0.76C+0.42CO_2+0.32H_2O+0.016C_5H_8 \quad (iv)$$

Thus, the amount of tar might be considered relatively small after the partial adjustment to remove a portion of the tar at the volatiles removal process, for example, 0.016 moles of tar per 1.5 moles of other constituents in the resulting producer gas (only about 1% tar). Thus even though the tar content might have been adjusted down from 40% to about 10% of the feed carbon material, this would successfully control the input so that the output producer gas would only have a small amount, such as about 1% tar after processing. Of course this is a theoretical example calculated to demonstrate the principals involved and those of ordinary skill in the art will understand from this example that substantially any acceptable tar content could be obtained by adjusting the tar content of the input source material without necessarily removing all of the tar at the input side.

According to other aspects of one or more embodiments of the invention the raw carbon source material may be heated in a non-oxidizing environment, as for example at 28 to remove volatile hydrocarbon constituents (such as methane and other relatively light or otherwise volatile hydrocarbons) and to produce a devolatilize carbon source. The volatiles may be collected at 30 for other uses or for additional processing. Whether, the volatiles are used as in co-generation of energy for the gasification process or other processes, collected for other uses, or otherwise removed or recombined with the output of the gasification process need not affect certain other useful aspects of the gasification process according to various embodiments of the invention. A surge tank or hopper may be used to facilitate stabilizing of pressure and/or flow between the devolitalization stage 28 and the gasification stage 32.

According to other aspects of one or more embodiments of the invention the devolatilized carbon source material is gasified at 32 by heating the carbon source material to a gasification temperature in a gasification enclosure, gasification oven, gasification generator, or other gasification device 32 (any acceptable gasification device may be referred to herein as a gasifier 32). Steam 34 and air 33 are supplied to react with the devolatilized carbon material in the gasification device 32 to thereby form a producer gas. In a gasification process a portion of the resulting product will be slag and a portion will be water that may be removed at 38. In one or more embodiments it has been found by the inventors that it may be useful to used air 33 having an enhanced oxygen content. In particular it has been found to be useful to use standard air and enhance the oxygen ($O_2$) content above the normal approximately 21% $O_2$ content found at most places on earth. It has been determined by the inventors that the quality or the percentage of $O_2$ in the air that is supplied for reaction in the gasification chamber 32 may be enhanced by use of any of a number of oxygen enrichment devices 40. For example, a pressure swing absorption device 42 that employs $N_2/O_2$ type molecular sieves 44 and 46 may increase the oxygen content of input pressurized air 36 sufficiently to provide increased oxygen content air 48 into the gasifier 32 so that a useful increase in the energy value results in the producer gas recovered at 50 from the gasifier 32.

Although, the consistent quality of the input carbon source materials results in a generally consistent quality of the producer gas output from the gasifier 32 at 50, fluctuations in quality due to the ranges of input considered to be acceptable at 16, can be further reduced by use of a homogenizer tank 52 in which output producer gas 50 is accumulated and allowed to mix and diffuse to form a uniform mixture of consistent quality producer gas in tank 52. The final product may be removed at 54 or otherwise conveyed or transferred for its intended use.

Figure 2:
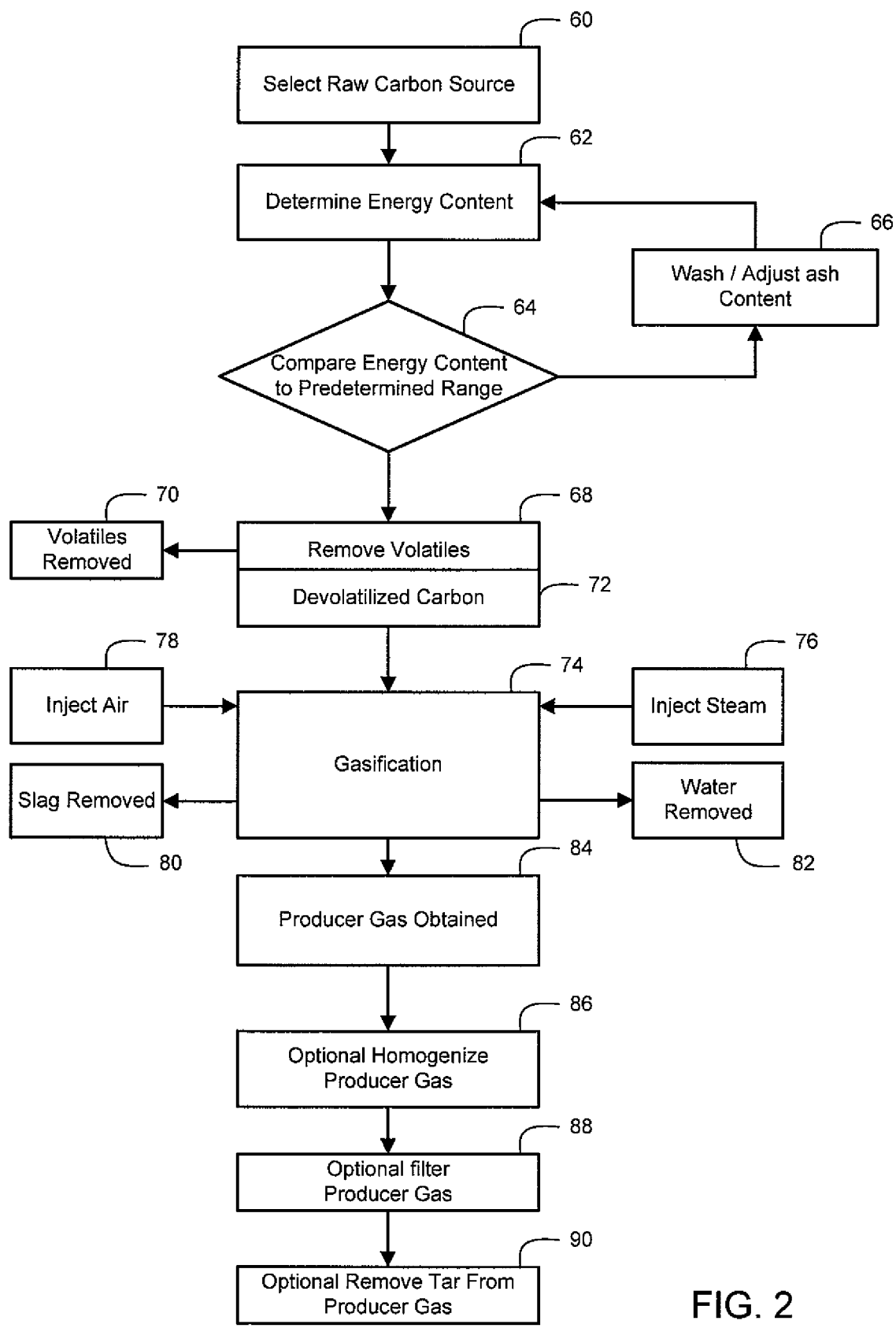
FIG. 2 is a flow chart showing a process for adjusting the variation of impurities, such as ash content, of a carbon feed source material for a gasification process according to one or more embodiments.

In FIG. 2, a flow chart shows one embodiment of a process for reducing the variation of impurities content of a carbon feed source material for a gasification process. At 60 the carbonaceous raw feed material is identified and selected. At 62 the ash content is determined by ASTM methods. In the particular embodiment depicted the impurities of interest might be ash. Although ash content is a common concern with coal and other carbon sources, it will be understood that in other types of impurities could also be considered adjusted without departing from certain aspects of the invention. Thus, in the case of considering ash, the ash content is checked at 64 or compared to a predetermined range of acceptable limits and it is determined whether the purity is within an acceptable range for the type of combustion device that will be fueled by the resulting producer gas. For example, in the case of intended use in an internal combustion engine, the ash content may be acceptable in a range of 0% to 3%, and in the case of intended use in providing heat for a boiler of steam turbine, the ash content may be acceptable in a range of 0% to 10%. If the ash content is not within the acceptable range, ash may be reduced by chemical or physical washings at 66. The washed carbon source is checked again and compared at 62 and 64, respectively. If the determined content is within the required range, the carbon source is supplied for removal of volatiles (such as methane) at 68. After volatile removal at 68, the volatiles may be extracted at 70 and the devolatilized carbon fuel source 72 is supplied to a gasification oven at 74. Steam 76 and air 78 are introduced into the gasification oven. Slag is removed 80 and water is removed 82. Producer gas is obtained at 84.

Optional processes may also be included such as optional homogenization 86, optional filtering of particulate matter at 88, and/or optional removal of tar at 90. When the input source material is maintained at appropriate levels of impurities, the optional processes for cleaning the producer gas after it is produced may be usefully eliminated.

In one embodiment, an aspect of the invention is to make the intake fuel source consistent. As shown in the flow diagram depicted in FIG. 3, the carbon fuel source may be identified and/or selected at 100. At 102 the energy content of the carbon fuel source may be determined based upon testing, empirical data, or determination factors for the carbon fuel source identified at 100. At 104 the energy content may be compared to an energy content determined to be acceptable for the intended use of the producer gas to be produced. For example, in the case of use in a boiler of a steam turbine the range may be 100 BTU/cubic foot plus or minus 15%. For another example, in the case of intended use in an internal combustion engine the range may be 120 BTU/cubic foot plus or minus 3%. If the energy content of the carbon fuel source has the predetermined energy content consistency, it may be provided at 108 for removal of volatiles such as methane that may be extracted at 110. Upon obtaining devolatilized carbon material at 112, the partially treated carbon source may be supplied to a gasification oven at 114. If the energy content is determined at 104 to be outside of the predetermined range of 85 to 115 BTU/cubic foot for the boiler (or 116 to 124 BTU/cubic foot for the IC engine) then the feed source is modified at step 106. After step 104, if the energy content is determined to be too high, material having lower energy content will be added at step 106 to compensate for the excess amount of energy outside of the range. At step 104, if the energy content is determined to be too low, material having higher energy content will be added at step 106 to compensate for the amount of the deficiency. When the energy level is then within the predetermined acceptable range, the combined material is supplied for volatile removal at 108 and then to the gasification oven at 114. Steam 116 and air 118 are introduced into the gasification oven 114 where the mixture of air ($N_2$ and $O_2$), steam ($H_2O$), and the consistent content, devolatilized carbon source material are heated to form producer gas, slag and excess water. Slag is removed at 120 and excess water is removed at 122. Producer gas is obtained at 124.

Optional processes may also be included such as optional homogenization 126, optional filtering of particulate matter at 128, and/or optional removal of tar at 130. When the input source material is maintained at appropriate levels of energy content the optional processes for homogenizing the producer gas after it is produced may be less critical for having a useful product. However homogenization can also further "smooth out" the already uniform consistency and might be useful or in some cases may be eliminated.

Figure 4:
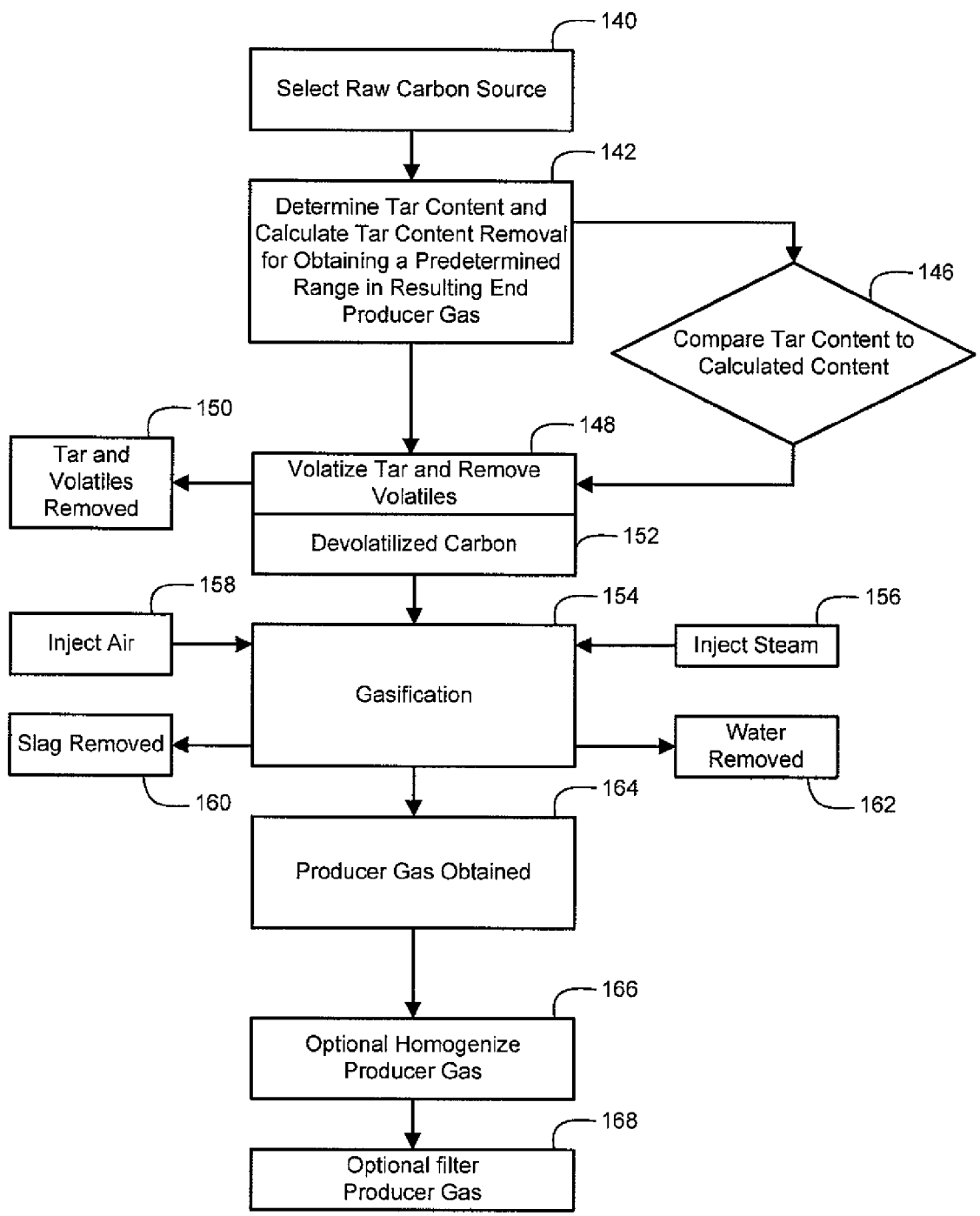
FIG. 4 is a flow chart showing a process for controlling the tar content of a carbon feed source material for a gasification process according to one or more embodiments.

In one embodiment, as shown in the flow diagram depicted in FIG. 4, the carbon fuel source may be identified and/or selected at 140. The tar content may be checked at 142 and the devolatilization at 148 may be controlled at 146 so that at least a portion of the tar is volatilized at 148 and removed at 150 to adjust the tar content. In one embodiment the amount of tar removed is compared at 146 to a calculated maximum acceptable value to control the amount removed or the amount remaining so that the total tar content of the carbon feed source is adjusted. The calculated maximum amount is determined so that the tar content of the feed will be use entirely in the gasification process and the resulting end product producer gas has a sufficiently low tar content for the intended purpose. For example the amount of burnable tar might be acceptable up to about 1% for use as a consistently burnable fuel for particular type of internal combustion engine or a turbine.

Other volatiles such as methane that may also be extracted at 150. Upon obtaining devolatilized carbon material at 152, the partially treated carbon source may be supplied to a gasification oven at 154. When the tar content level is then within the predetermined acceptable range, the combined material is supplied to the gasification oven at 154. Steam 156 and air 158 are introduced into the gasification oven 154 where the mixture of air ($N_2$ and $O_2$), steam ($H_2O$), and the consistent content, devolatilized carbon source material are heated to form producer gas, slag and excess water. Slag is removed at 160 and excess water is removed at 162. Producer gas is obtained at 164. Optional homogenizing 166 and optional filtering may be further performed at 168.

Figure 3:
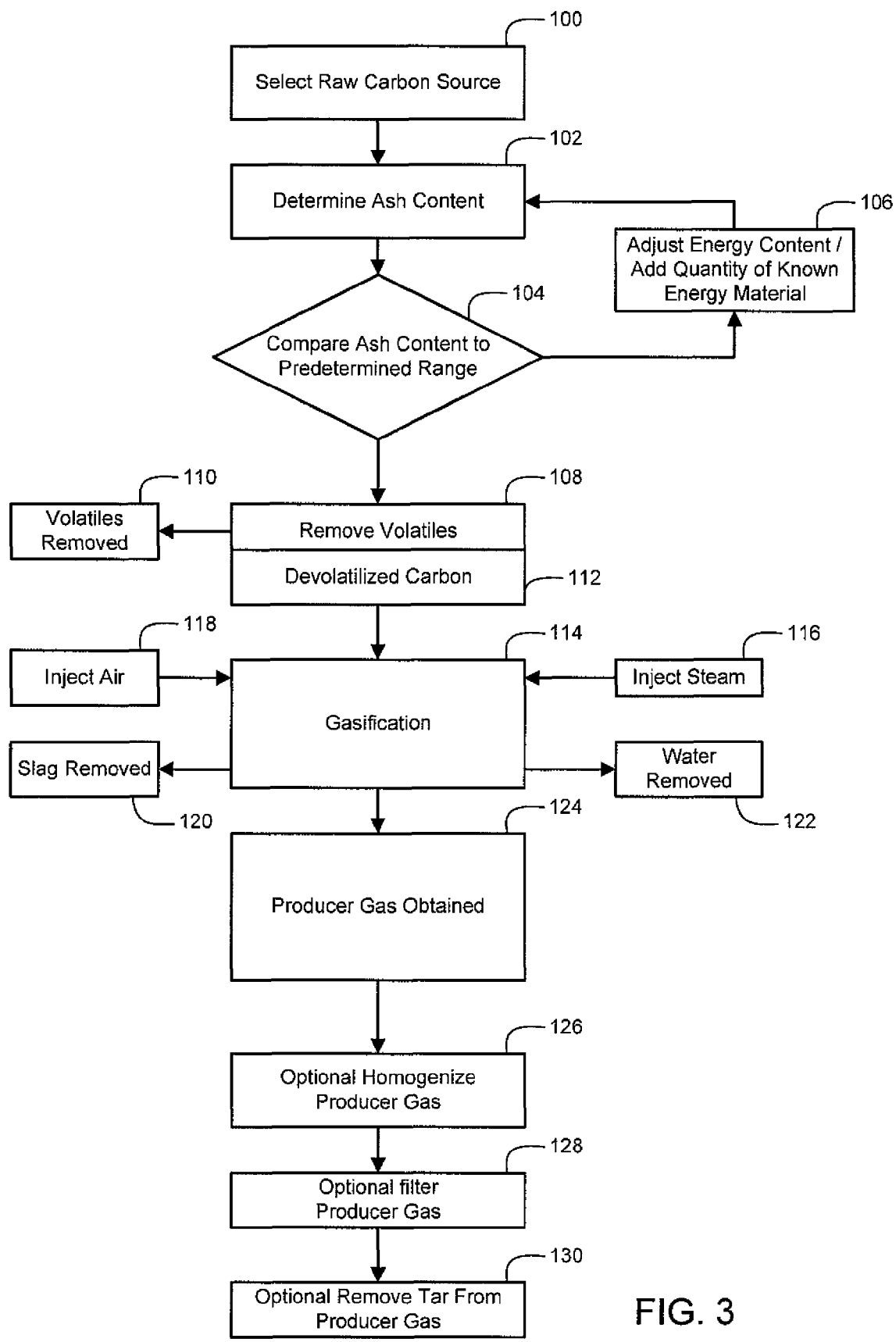
FIG. 3 is a flow chart showing a process for controlling the consistency of energy value content of a carbon feed source material for a gasification process according to one or more embodiments.

In FIG. 4 a flow chart shows a combination of the processes of FIGS. 2 and 3 and also the enhancement of the oxygen content of the air injected into the gasifier. At 140 the carbonaceous raw feed material is identified and selected. At 142 the energy content of the carbon fuel source may be determined based upon testing, empirical data, or determination factors for the carbon fuel source identified and selected at 140. At 144 the energy content may be compared to an energy content determined to be acceptable for the intended use of the producer gas to be produced. If the energy content is determined at 144 to be outside of the predetermined range then the feed source is modified at step 146. After step 144, if the energy content is determined to be too high, material having lower energy content will be added at step 146 to compensate for the excess amount of energy outside of the range. At step 144 if the energy content is determined to be too low, material having higher energy content will be added at step 146 to compensate for the amount of the deficiency.

At 148 the ash content is determined by ASTM methods. At 150 the ash content is checked or compared to a predetermined range of acceptable limits and it is determined whether the purity is within an acceptable range for the type of combustion device that will be fueled by the resulting producer gas. If the ash content is not within the acceptable range, ash may be reduced by chemical or physical washings at 152. The washed carbon source may be checked again at 148 and compared at 150. If the determined content is within the required range, the carbon source is supplied for removal of volatiles at 154. Thus, when both the energy content and the impurities content are within the predetermined acceptable range, the combined carbonaceous material is supplied for volatile removal at 154 so that the volatiles are removed at 156. The devolatilized carbon material is then provided to the gasification oven at 160. Steam 162 and enhanced oxygen content air 164 are introduced into the gasification oven 160. In the gasification oven the mixture of air (reduced $N_2$ and enhanced $O_2$), steam ($H_2O$) and the carbon material are heated to produce a producer gas having an enhanced energy content. The impurities are also consistent and the energy level is also consistent. Because one batch after another can be produced that is consistent the process can be either batch by batch or the producer gas can be collected in a large tank such as a homogenization tank, so that the process is substantially continuous.

Figure 5:
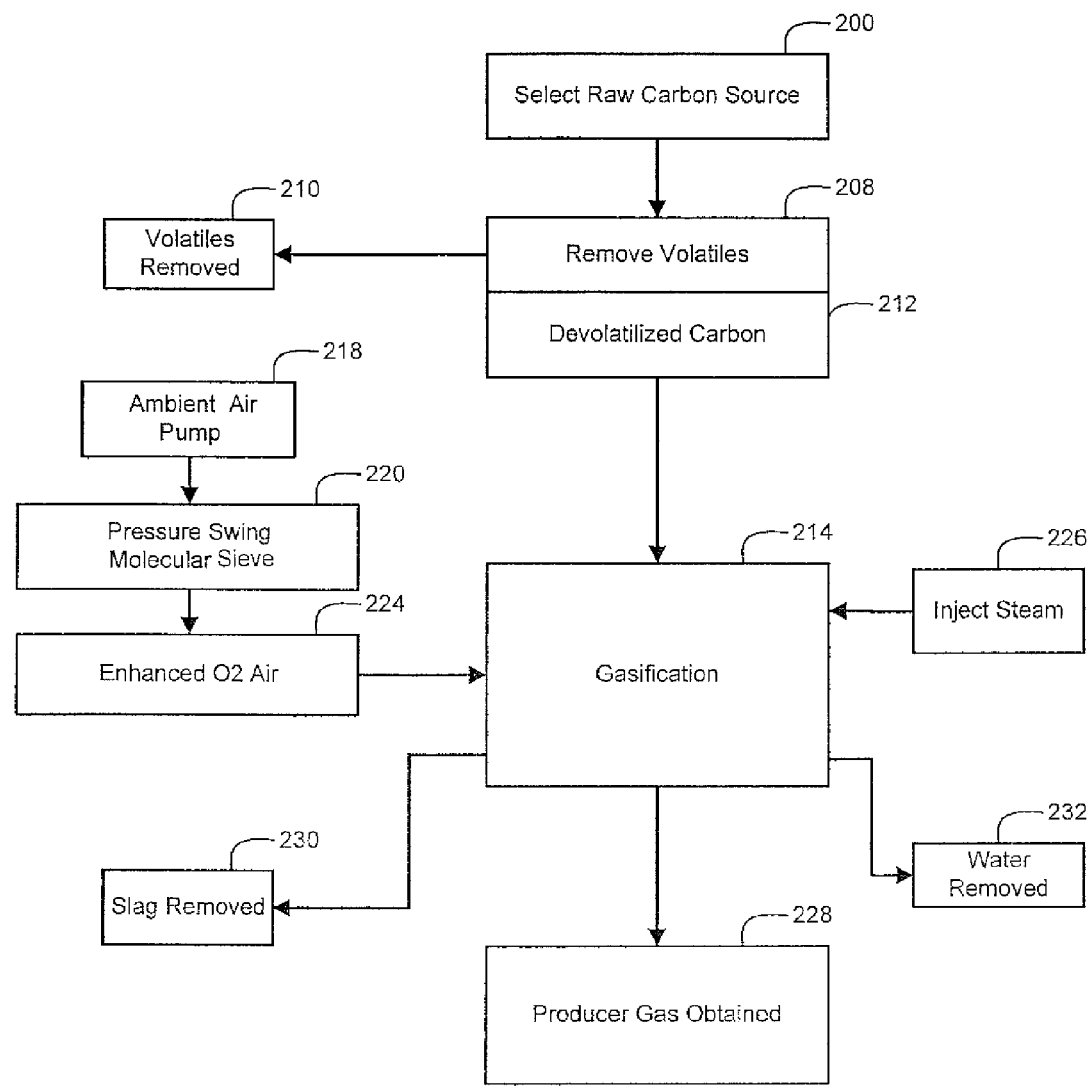
FIG. 5 is a flow chart showing a process for enhancing the energy content of producer gas by increasing the concentration of oxygen in air for gasification.

According to one aspect of one or more embodiments of the gasification process as shown in FIG. 5, the energy content of producer gas may be increased by causing the percentage or proportional content of inert gas $N_2$ to be reduced and the percentage content of oxidizable constituents to be increased. In this embodiment, the raw carbon source is selected at 200, the volatiles are removed at 208, and collected at 210. The devolatilized carbon at 212 is introduced into the gasifier for gasification at 214. In one embodiment, ambient air is introduced into the process at an air pump 226 and the input standard air (typically 21% Oxygen and 78% Nitrogen) is subjected to any one of a number of oxygen concentration enhancing devices 220 such as a pressure swing molecular sieve device 220. The enhanced oxygen content air is injected at 224 for use during gasification at 214. A generalized chemical conversion process that occurs after volatiles have been driven off by heating and during a gasification process in an air environment at temperatures of about 700° C., may be represented by a generalized chemical equation as shown in the equations below:

$$C_xH_yO_z + AIR(O_2N_2) + H_2O \rightarrow N_2 + CO + H_2 + CO_2 + H_2O + O_2 \quad (I)$$

Including the following sub processes $$C + O \rightarrow CO_2 \quad (II)$$

$$C + CO_2 \rightarrow 2CO_2 \quad (III)$$

$$C + H_2O \rightarrow H_2 + CO \quad (IV)$$

It will be understood that the amount of oxygen ($O_2$) provided by the carbon fuel $C_xH_yO_z$ together with the oxygen $O_2$ that is provided by the air is not likely to be very large relative to the large proportional amount of $N_2$ provided by the air, 78%. Thus, the amount of $N_2$ in the air dominates the formation of gas and results in the low energy level of the producer gas that would normally contain about 50%-60% $N_2$. The greater the percentage of inert $N_2$, the lower the energy value of the resulting producer gas. It would be expensive to use pure oxygen because of the production cost of pure oxygen. However, the inventors have found that it can be cost effective to merely enhance or enrich the oxygen level of the mixture of air that is used in a continuous gasification process. Every percentage point of nitrogen reduced compared to the oxygen increases the energy content of the resulting producer gas.

In one embodiment of the invention the enhancement may be provided by bringing in the air for the gasification process through a molecular sieve system as more fully discussed below referring again to FIGS. 1 and 5. Thus, in one or more embodiments of the invention a molecular sieve type gas separation system may be uniquely applied and adapted for use with a gasification system as shown at 40 of FIG. 1 (and also at 224 of FIG. 5). For example, in FIG. 1 (or FIG. 5), a molecular sieve 42 (224) of the type know as a pressure swing adsorption process (see for example U.S. Pat. No. 4,543,109 titled "Molecular Sieve Type Gas Separation Systems" issued to Hamlin et al. Sep. 24, 1985, incorporated herein by reference), may be adapted to the inventive system. In such a pressure swing molecular sieve 42 (224), adsorption catalyst is coated on one or more molecular sieve beds 44 and 46 (not shown in FIG. 5). Operation may involve charging each molecular sieve bed with feed gas mixture under a charge pressure of several atmospheres from air pump 35 (218). In one embodiment the feed gas is air under pressure of 5 to 6 atmospheres. The pressurized feed of air is continued to the bed to maintain the charge pressure during delivery of output enhanced oxygen air to the gasification system in place of ambient air. When one of the molecular sieve beds 44 or 46 (not shown in FIG. 5) approaches saturation, the feed gas is temporarily discontinued with an alternating air valve 37 and the bed is vented to release the charge pressure, so that the pressure in the molecular sieve "swings" and the bed is purged of nitrogen at valve 39 (not shown in FIG. 5). The pressurizing of the sieve bed promotes adsorption of the constituent namely nitrogen in this case that are retained by the bed under pressure. The subsequent depressurizing promotes desorption of the retained constituents, nitrogen, to facilitate flushing of nitrogen from the bed. Multiple channels can be used and can overlap in sequence of pressurized enhanced oxygen supplied to the gasification process and depressurized desorption or purging of nitrogen. The remaining air has enhanced oxygen and is supplied alternately from molecular sieve 44 and then from sieve 46, through valve 47, and into the gasification oven 32 at 48 (not shown in FIG. 5). By inexpensively enhancing the oxygen content of the intake air, the energy potential or energy quality of the output producer gas is significantly increased.

During standard gasification processes, the inert portion of the air passes through the process without forming energy producing components in the producer gas. Because nitrogen is normally such a large part of resulting producer gas, generally 50% to 60%, only about 30% to 40% of the producer gas provides the heating value. Replacing air with pure oxygen is not normally practical and can be relatively expensive. However, the result should be to remove the 50% to 60% nitrogen content of the producer gas. The absence of nitrogen permits the energy producing components to increase from 35% to 40% up to about 85% to 95%. This would theoretically more than double the energy content from about 90 to 120 BTU/cubic foot to about 250 to 285 BTU/cubic foot. Approximately from about 120 BTU/cubic foot to about 300 BTU/cubic foot.

In another embodiment of the invention, because 100% elimination of nitrogen may not be cost effective and practical at required continuous flow volumes and using current gas separation technology, replacing air with enhanced oxygen air, having nitrogen reduced by only slightly more than one half can result in nearly doubling the energy value of the resulting producer gas. For example, a reduction of nitrogen content of the producer gas down to 20% to 25% can theoretically increase the energy containing components up to about 60% to 75% or up to about 180 to 225 BTU/cubic foot approximately from about 120 BTU/cubic foot to about 240 BTU/cubic foot. This would nearly double the energy value of the producer gas without requiring the traditional expense of obtaining 100% pure oxygen. The capital investment and operation cost become extremely reasonable, making it very cost effective to use this technology and the resulting producer gas as a fuel source for internal combustion engine operation and for medium scale electric generation.

Figure 6:
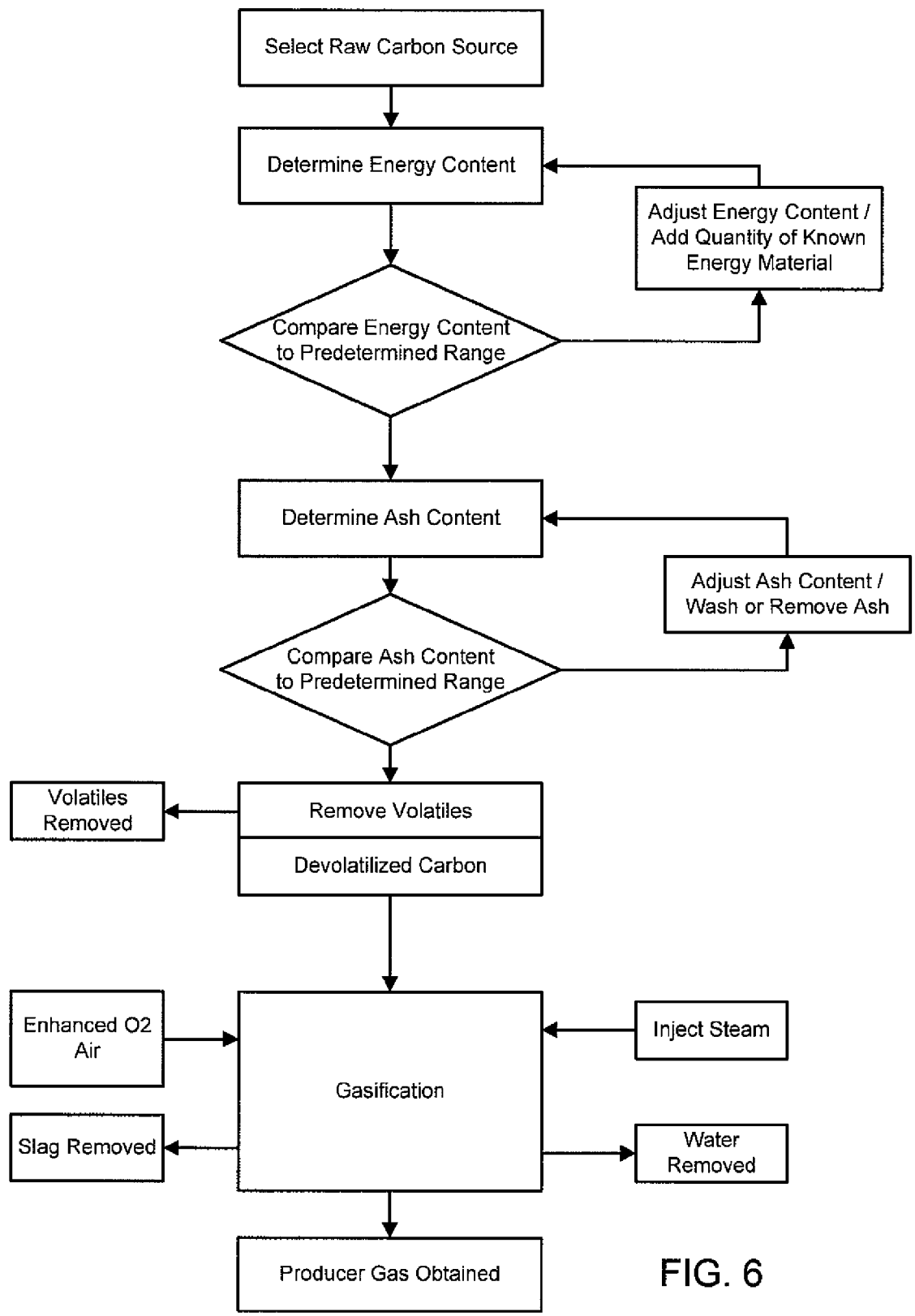
FIG. 6 is a flow chart showing a combination gasification process according to one or more embodiments of the invention.

FIG. 6 shows a flow diagram that combines the features of FIGS. 2, 3, 4 and 5. It will be understood that any combination of the features might be beneficially employed according to one or more embodiments of the invention. For example, in one or more embodiments the process of FIG. 2 may be useful with the processes of FIG. 3 or FIG. 4 or FIG. 5. In one or more embodiments the process of FIG. 3 may be useful with the process of FIG. 4 or with the process of FIG. 5. In one or more embodiments the process of FIG. 4 may be useful with the process of FIG. 5. In one or more embodiments the process of FIGS. 2, 3 and 4 may be useful together. In one or more embodiments the process of FIGS. 2, 4 and 5 may be useful together. In one or more embodiments the process of FIGS. 3, 4 and 5 may be useful together. In one or more embodiments the process of FIGS. 2, 3, 4 and 5 may be useful together as shown in the flow diagram of FIG. 6. It has been found by the inventors that all the theoretical benefits combined together should provide a best mode of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A gasification process for making producer gas comprising:
supplying a consistent quality raw carbon source material;
adjusting impurity content of the raw carbon source material to within an acceptable consistent range of impurity content, wherein adjusting impurity content of the raw carbon source material comprises measuring ash content of the batch of raw carbon source material, comparing the measured ash content to a predetermined acceptable range of ash content values for an intended use of the producer gas to be formed, and if the measured ash content is within the acceptable range, accepting the batch of raw carbon source material for supplying to the gasification generator, and if the ash content is outside of the acceptable range, adjusting the ash content to within the acceptable range;
heating the raw carbon source material in a non-oxidizing environment to remove volatile hydrocarbon constituents and to produce a devolatilized carbon source material; and
gasifying the devolatilized carbon source material by heating the devolatilized carbon source material to a gasification temperature in a gasification generator, supplying steam, and supplying enhanced oxygen content air to react in the gasification generator and to thereby form consistent, high energy value, and low impurity producer gas.

2. The gasification process of claim 1 wherein adjusting the measured ash content to within the acceptable range if the measured ash content is outside a high end of the acceptable range, comprises washing the raw carbon source material to remove a sufficient amount of ash to adjust the measured ash content to within the acceptable range.

3. A gasification process for making producer gas comprising:
supplying a consistent quality raw carbon source material;
adjusting impurity content of the raw carbon source material to within an acceptable consistent range of impurity content, wherein adjusting impurity content of the raw carbon source material comprises determining a maximum tar content that will fully convert to producer gas, subjecting a batch of raw carbon material to a tar adjusting process including determining an average measured tar content of the batch of raw carbon material, and heating the raw carbon material to remove a quantity of tar as volatile matter, wherein the quantity of the removed tar reduces the tar content to less than or equal to the maximum tar content that will fully convert to producer gas, and supplying the batch of tar content adjusted carbon source material for gasification while a next batch of raw carbon source material is subjected to the tar adjusting process;
heating the raw carbon source material in a non-oxidizing environment to remove volatile hydrocarbon constituents and to produce a devolatilized carbon source material; and
gasifying the devolatilized carbon source material by heating the devolatilized carbon source material to a gasification temperature in a gasification generator, supplying steam, and supplying enhanced oxygen content air to react in the gasification generator and to thereby form consistent, high energy value, and low impurity producer gas.

4. A gasification process for making producer gas comprising:
supplying a consistent quality raw carbon source material;
adjusting impurity content of the raw carbon source material to within an acceptable consistent range of impurity content;
heating the raw carbon source material in a non-oxidizing environment to remove volatile hydrocarbon constituents and to produce a devolatilized carbon source material; and
gasifying the devolatilized carbon source material by heating the devolatilized carbon source material to a gasification temperature in a gasification generator, supplying steam, and supplying enhanced oxygen content air to react in the gasification generator and to thereby form consistent, high energy value, and low impurity producer gas, wherein gasifying the devolatilized carbon source material by heating the carbon source material to a gasification temperature in a gasification generator and supplying steam and enhance oxygen air to react and form consistent, high energy value, low impurity producer gas comprises heating the devolatilized carbon source material to form char, passing steam through and around the devolatilized carbon source material during the heating, and supplying enhance oxygen air and passing the enhanced oxygen air through and around the carbon source material during heating so that the consistent, high energy value, low impurity producer gas is formed.

5. The gasification process of claim 4 wherein supplying enhanced oxygen air comprises supplying pressurized air through a pressure swing molecular sieve for separating oxygen and nitrogen from the air to produce an enhanced oxygen stream and passing the enhanced oxygen stream through and around the devolatilized carbon source material.

* * * * *